US006409362B1

(12) United States Patent
Lundberg et al.

(10) Patent No.: US 6,409,362 B1
(45) Date of Patent: Jun. 25, 2002

(54) VEHICLE LAMP BOOT

(75) Inventors: Andrew J. Lundberg, Stanwood, WA (US); Christopher E. Swygart, North Vernon, IN (US)

(73) Assignee: Valeo Sylvania LLC, Seymour, IN (US)

( * ) Notice: Subject to any disclaimer, the term of this patent is extended or adjusted under 35 U.S.C. 154(b) by 0 days.

(21) Appl. No.: 09/731,085

(22) Filed: Dec. 6, 2000

(51) Int. Cl.[7] .................................................. B60Q 1/00
(52) U.S. Cl. ........................ 362/267; 362/310; 362/546
(58) Field of Search ................................ 362/267, 310, 362/546, 516, 347, 349, 350

(56) References Cited

U.S. PATENT DOCUMENTS

| | | | | |
|---|---|---|---|---|
| 5,072,348 A | * 12/1991 | Tsukada | ...................... | 362/297 |
| 5,560,706 A | * 10/1996 | Yamazaki et al. | .......... | 362/267 |
| 5,758,953 A | * 6/1998 | Moore et al. | ............... | 362/267 |
| 6,250,787 B1 | * 6/2001 | Matubara | ..................... | 362/267 |

* cited by examiner

*Primary Examiner*—Thomas M. Sember
(74) *Attorney, Agent, or Firm*—William E. Meyer

(57) ABSTRACT

A vehicle lamp boot structure is disclosed wherein the lip edge of a boot is captured in a groove. One defining wall of the groove is higher than the other defining wall to thereby help latch the insert lip in the groove and prevent disengagement of the lip from the groove. The boot seal as a result has been found to be more durable.

8 Claims, 4 Drawing Sheets

VEHICLE LAMP BOOT

TECHNICAL FIELD

The invention relates to vehicle lamps and particularly to vehicle lamp boots. More particularly the invention is concerned with a vehicle lamp boot sealed to a housing to exclude water and dirt.

BACKGROUND ART

Vehicle headlamps are commonly formed with replaceable lamp capsules that extend into a reflector cavity. To aim the headlamp, the whole lamp housing may be adjusted up and down or right and left. It is now common to move just a portion of the lamp that includes the lamp capsule, the reflector or both. To prevent water and dirt from entering the region of the lamp housing between the fixed and the adjustable portions, a flexible rubber boot is joined to each to bridge between the two portions. Commonly an edge of the boot is inserted in a crevice to latch the boot to the housing. It has been found that the inserted portion may not be inserted well during manufacture; may work itself free during normal operations, or during the adjustment of the lamp or a combination of these. In any case, if the boot works itself free, the purpose of the boot fails, and water and dirt are free to enter through the unsealed portion. There is then a need for an improved seal for a vehicle lamp boot.

DISCLOSURE OF THE INVENTION

The seal of a vehicle lamp boot assembly can be improved by forming a lamp housing with an exterior sidewall and an interior sidewall, the exterior sidewall and the interior sidewall extending in similar patterns offset one from the other to define therebetween a connected groove wherein the exterior sidewall has a height measured from the bottom of the groove that is greater than the height of the interior sidewall, and a boot with a barrier wall and a lip edge, the lip edge circumferentially conforming to the defined groove and positioned in the defined groove. The barrier wall is positioned adjacent the interior sidewall portion of the housing.

BEST MODE FOR CARRYING OUT THE INVENTION

Figure 1:
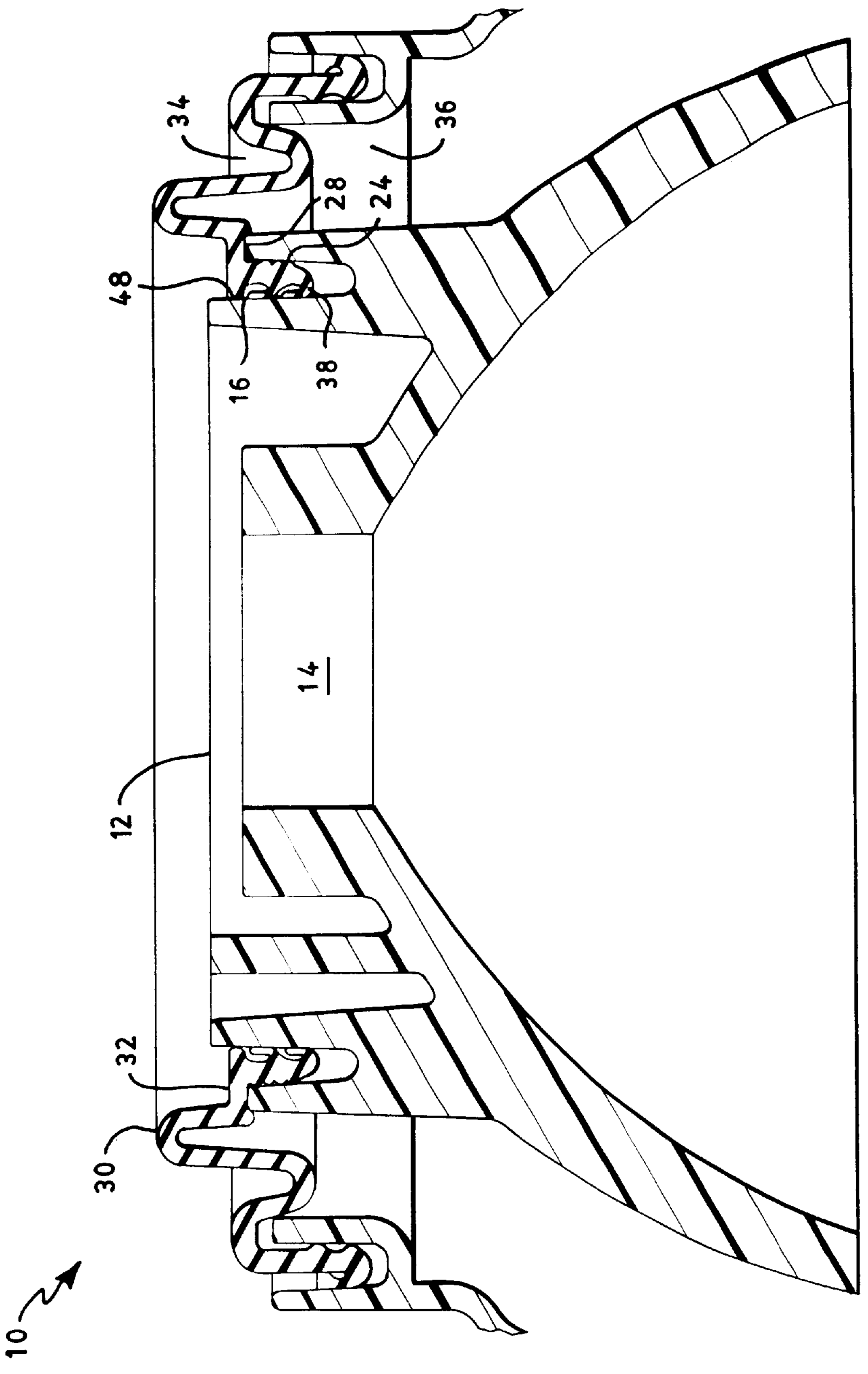
FIG. 1 shows a cross sectional view of a preferred embodiment of a vehicle lamp boot assembly partially cut away.

FIG. 1 shows a cross sectional view of a preferred embodiment of a vehicle lamp boot assembly 10 partially cut away. Like reference numbers designate like or corresponding parts throughout the drawings and specification. The vehicle lamp boot seal is assembled from a lamp reflector 12, and a boot 30.

Figure 2:
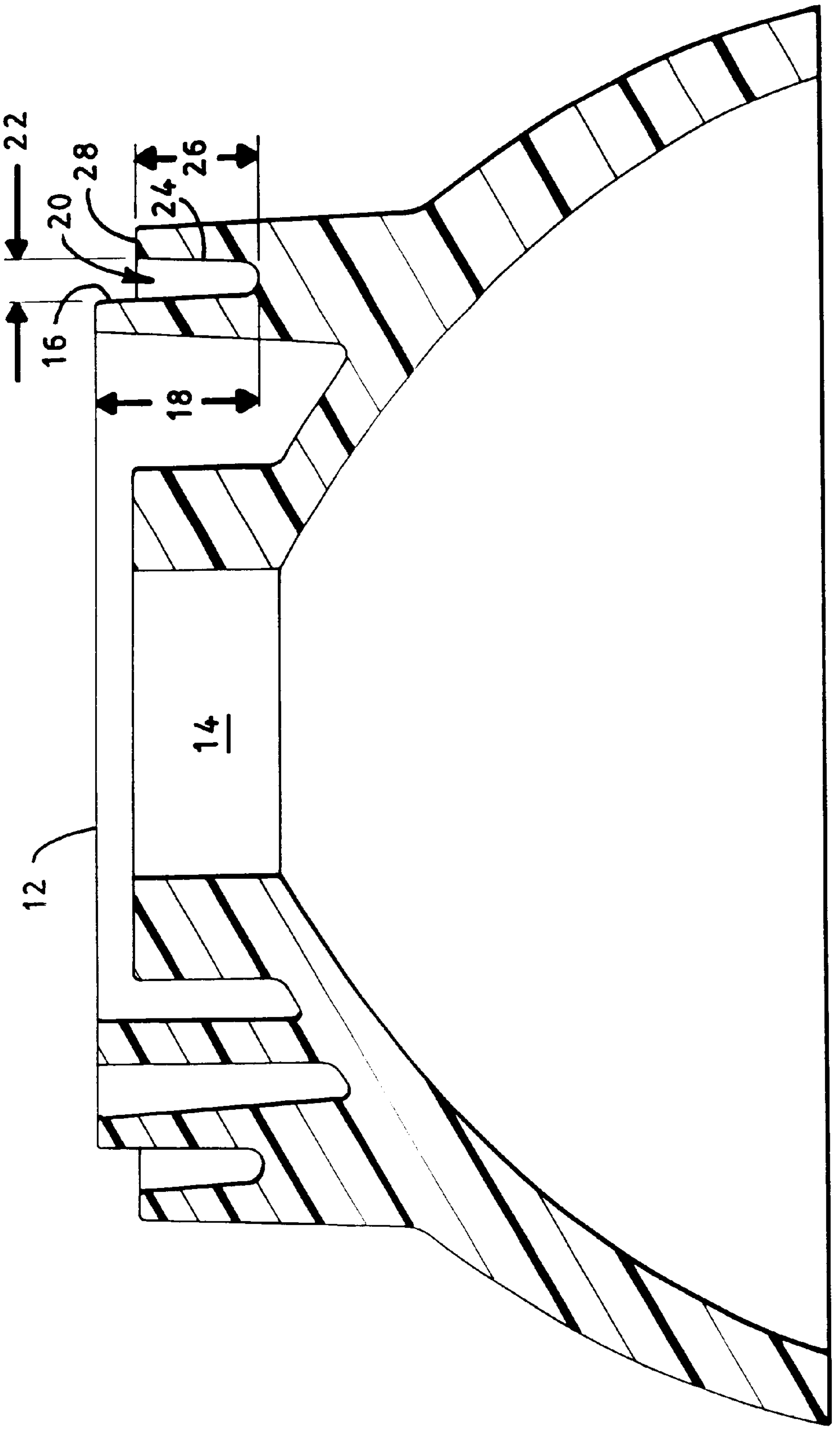
FIG. 2 shows cross section of part of a lamp housing partially cut away.

FIG. 2 shows cross section of part of a lamp reflector 12 partially cut away. The lamp reflector 12 may be made out of rigid material such as a filled plastic resin to have the general form of a shell with a through passage 14. The through passage 14 may be a circular opening extending from a rear side of the reflector 12 into an internal cavity region of the reflector 12. The lamp reflector 12 has an inner sidewall 16 with a first height 18. The height is measured from the top of the inner sidewall 16 to the bottom of an adjacent groove 20. The inner sidewall 16 extends around the formed through passage 14 and faces away from the through passage 14. Adjacent the inner sidewall 16 on a side away from the through passage 14 is a groove 20 with a width 22. Forming a second side of groove 20, the lamp reflector 12 has an outer sidewall 24 with a second height 26. The outer sidewall 24 also extends around the formed through passage 14. The preferred inner sidewall 16, groove 20 and outer sidewall 24 are all circular and concentric. It is understood that the groove 20 is preferably circular, but it may have alternative circumferential shapes, such as oval, or rectangular. It is only necessary that the circumferential shape be connected in a simple circuit. The preferred inner sidewall 16 is a smooth wall forming one side of the groove 20. The groove 20 provides a crevice sufficiently wide 22 and deep 26 to receive and hold an insert lip 38 of the boot 30. The preferred groove 20 is several millimeters wide and is deeper than it is wide. The outer sidewall 24 has a smaller height than the height of the inner sidewall 16. Height is again measured from the bottom of the groove 20 to the top of the outer sidewall 24. The height difference between the inner sidewall 16 and the outer sidewall 24 is preferably equal to or greater than the thickness 40 of the boot 30. The preferred outer sidewall 24 also has a flat or planar top wall 28 to provide a stabile block to which the boot 30 may be pressed.

Figure 3:
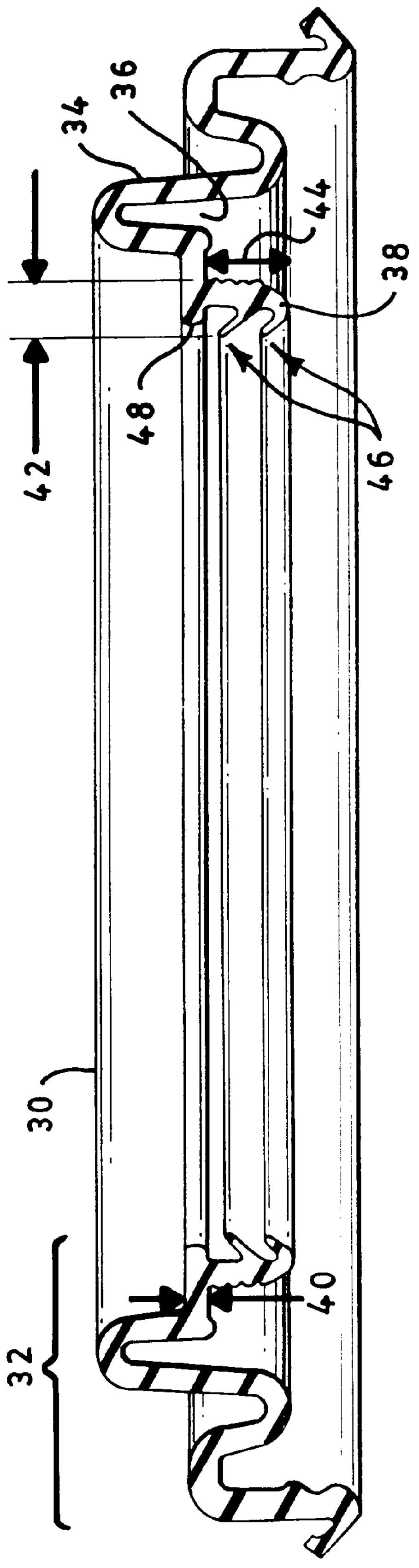
FIG. 3 shows a cross section of boot partially cut away.

FIG. 3 shows a cross section of boot 30 partially cut away. The boot 30 may be made out of flexible material such as rubber to have the general form of a barrier wall 32 with an exterior side 34 and an interior side 36 and a insert lip 38 conforming to the circumferential pattern of the groove 20. The distance between the exterior side 34 and the interior side 36 defines the barrier wall thickness 40. The lamp reflector 12 by means of the two sidewalls 16, 24 defining the groove 20 retains the insert lip 38 of the boot 30. The barrier wall 32 is designed to flex while at the same time exclude selected materials, such as water or dirt. Positioned along boot 30 is insert lip 38. The insert lip 38 is designed to conformally fit in the groove 20. The preferred insert lip 38 extends perpendicularly from the barrier wall 32 with a compressed 42 thickness equal to the gap width 22, and a compressible length 44 equal to or slightly less than the groove depth 26. The preferred insert lip 38 includes one or more ribs 46 extending parallel to the circumference of the insert lip 38. The ribs 46 may have semicircular, tooth like or similar cross sectional shapes to provide a region of the insert lip 38 that is solidly pressed against one or both of the sidewalls 16, 24 defining the groove 20 all the way around the groove 20. The insert lip 38 can then be sealed in the groove 20 to the sidewalls 16, 24 thereby preventing leakage around the insert lip 38 end of the boot 30.

Figure 4:
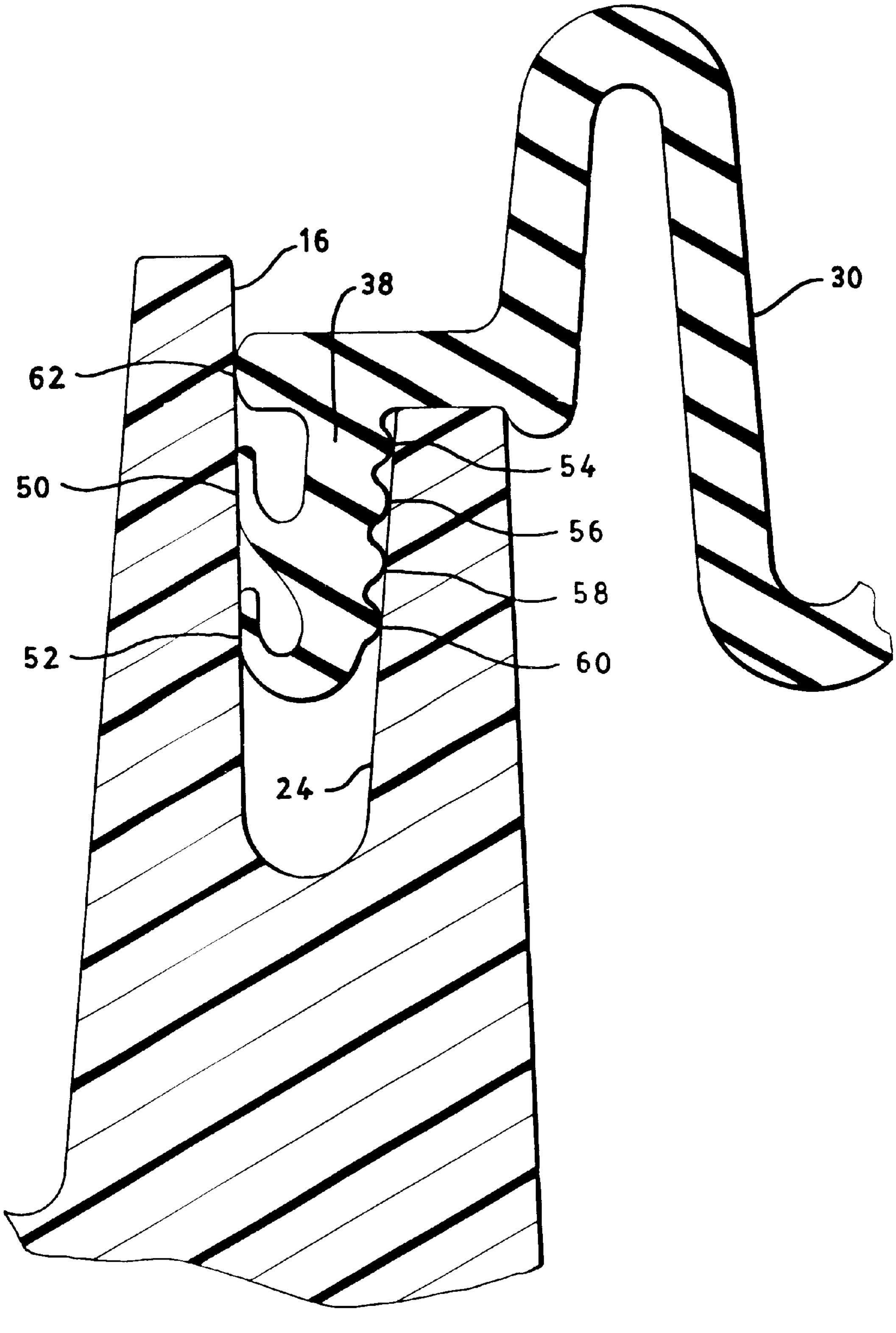
FIG. 4 shows a detailed cross section of a preferred alternative of the lamp housing and boot partially cut away.

FIG. 4 shows a detailed cross section of a preferred alternative of the lamp housing and boot partially cut away. The insert lip 38 includes two flap like sections 50, 52 that are bent over in facing the inner sidewall 16. The insert lip 38 also includes four semicircular ribs, 54, 56, 58, and 60 compressed against the outer sidewall 24. A fifth rib 62 abuts the inner sidewall 16 at the entrance to the groove 20.

The insert lip 38 of the boot 30 is fitted in the groove 20, with the exterior side 34 facing the inner sidewall 16, and interior side 36 facing the outer sidewall 24. The barrier wall 32 is then pressed in place to bring the interior side 36 of the barrier wall 32 flush with the top wall 28 of the reflector 12 adjacent the outer sidewall 24 all the way around the circumference of the groove 20. The insert lip 38, positioned in the groove 20, is then compressed between the sidewalls 16, 24 defining the groove 20. The exterior side 34 of the boot 30 is then positioned at or below the height of the inner sidewall 16. The end edge 48 of the boot 30 may also be positioned, or even slightly compressed against inner sidewall 16. By positioning the exterior of the boot 30 below the height of the inner sidewall 16, it has been found that the boot 30 is resisted or prevented from leveraging against the inner sidewall 16 to then rock, pull or twist the insert lip 38 out of the groove 20. By positioning the end edge 48 of the boot 30 adjacent the inner sidewall 16, boot 30 flexing, rocking or twisting of the insert lip 38 is resisted thereby securing a longer lasting seal.

In a working example some of the dimensions were approximately as follows: The lamp housing was made of rigid material such as a filled plastic resin, and had an exterior sidewall 3.0 millimeters (0.12 inch) higher than the interior sidewall. An interior sidewall had a height of 12.0 millimeters (0.47 inch). The two sidewalls provided a gap of 4.0 millimeters (0.16 inch). The boot was made of flexible material such as rubber, and had a barrier wall about 1.5 millimeters (0.06 inch) thick, an insert lip about 4.0 millimeters (0.16 inch) long. The insert lip included 5 ribs and 2 flap sections and stood up from the body of the insert lip by 2.18 millimeters (0.0 inch). In tests, it was found that a prior art boot with level sidewalls forming the groove could withstand 2.25 pounds per square inch of air pressure. By increasing the exterior sidewall by 1.5 millimeters, the newly designed boot held from 3.5 to 4.75 pounds per square in of air pressure. This amounted to an increase of from 55% to 110% in seal strength. The disclosed operating conditions dimensions, configurations and embodiments are as examples only and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims. It is understood that, while it may be less convenient, the height of the inner sidewall 16 may be extended by a second piece, attached to the housing by designer's choice. The extended wall section of the inner sidewall 16 then abuts the end 48 of the barrier wall 32 adjacent the groove 20. This abutment resists rotational turning of the boot 30 that would otherwise lift the insert lip 38 from the groove 20. Similarly, the boot 30, including the barrier wall 32 does not bridge groove 20 so as to form an extending lever arm at end 48 that with rotation would again assist the lifting of the insert lip 38.

What is claimed is:

1. A vehicle lamp boot assembly comprising:

a) a lamp housing with an exterior sidewall and an interior sidewall, the exterior sidewall and the interior sidewall extending in similar patterns offset one from the other to define therebetween a connected groove wherein the exterior sidewall has a height measured from a bottom of the groove that is greater than the height of the interior sidewall, and b) a flexible boot with a barrier wall and a lip edge, the lip edge circumferentially conforms to the defined groove and is positioned in the defined groove, and the barrier wall is positioned adjacent the interior sidewall portion of the housing.

2. The lamp boot assembly in claim 1, wherein the lamp housing has a circular opening extending from a rear side of the housing into an internal cavity region of the housing, and the defined groove encircles the circular opening.

3. The lamp boot assembly in claim 1, wherein the exterior sidewall defines a circular ring.

4. The lamp boot assembly in claim 1, wherein the exterior sidewall and the interior sidewall are separated by a constant width.

5. The lamp boot assembly in claim 4, wherein the exterior sidewall and the interior sidewall are separated by a few millimeters.

6. The lamp boot assembly in claim 1, wherein the lip edge extends perpendicularly to the barrier wall with a thickness less than the width of the groove, and a length slightly less than the depth of the groove, and has one or more ribs extending parallel to the length of the groove.

7. The lamp boot assembly in claim 1, wherein the boot does not extend across the exterior sidewall in a direction away from the barrier wall.

8. The lamp boot assembly in claim 1, wherein a block is formed on the boot adjacent the end of the barrier wall to abut the exterior sidewall.

* * * * *